United States Patent [19]
Ceperley

[11] 4,355,517
[45] Oct. 26, 1982

[54] RESONANT TRAVELLING WAVE HEAT ENGINE

[76] Inventor: Peter H. Ceperley, 4803 Clemons Ct., Annandale, Va. 22003

[21] Appl. No.: 204,328

[22] Filed: Nov. 4, 1980

[51] Int. Cl.$^3$ .................................................. F03G 7/00
[52] U.S. Cl. ........................................ 60/721; 60/517; 62/467 R
[58] Field of Search ............... 60/517, 520, 650, 682, 60/721; 62/6, 118, 467 R; 116/DIG. 22

[56] References Cited

U.S. PATENT DOCUMENTS

| | | | |
|---|---|---|---|
| 2,549,464 | 4/1951 | Hartley | 116/DIG. 22 |
| 3,339,635 | 9/1967 | Brandon | 62/467 X |
| 4,114,380 | 9/1978 | Ceperley | 60/721 |

*Primary Examiner*—Allen M. Ostrager
*Assistant Examiner*—Stephen F. Husar

[57] ABSTRACT

This is an improvement to a travelling wave heat engine. The latter uses acoustical travelling waves to force a gas in a differentially heated regenerator to undergo a Stirling thermodynamic cycle and thereby converts thermal energy into acoustical energy or vice versa, depending on the direction of the wave propagation. This patent concerns the addition of a resonant cavity around the regenerator to superimpose a standing wave to the travelling wave in order to augment the pressure component of the travelling wave without adding to the velocity component. This increases the level of acoustical power that can be put through the engine for a given level of regenerator viscous loss and so increases the engine's specific power which is limited by regenerator viscous losses.

7 Claims, 6 Drawing Figures

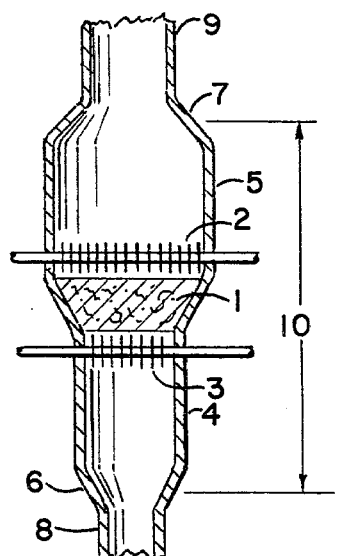
FIG. 1
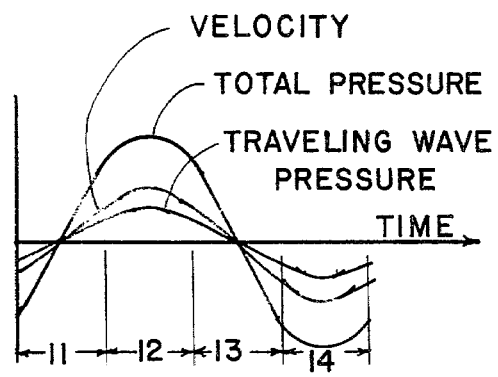
FIG. 2
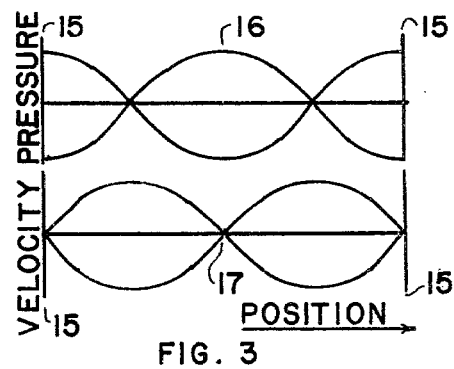
FIG. 3
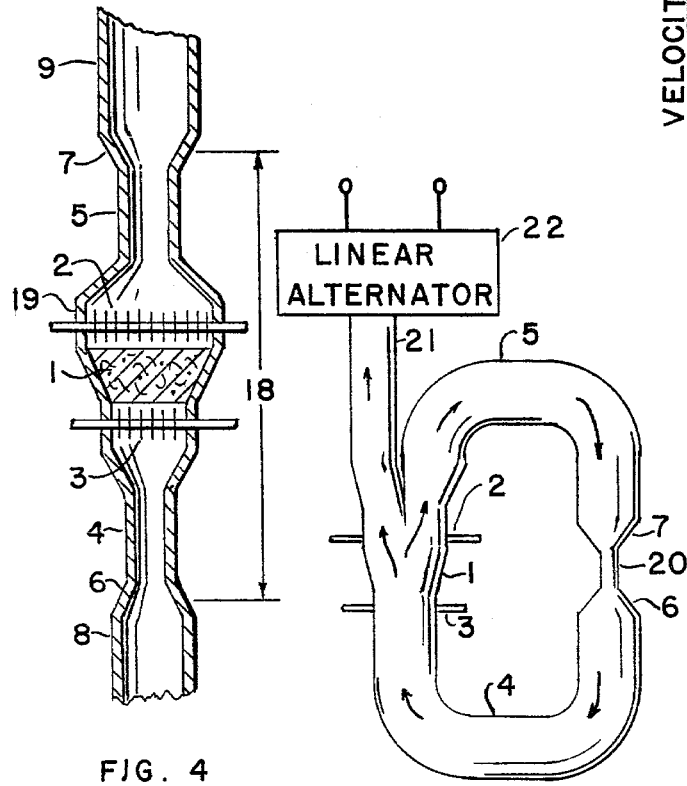
FIG. 4
FIG. 5
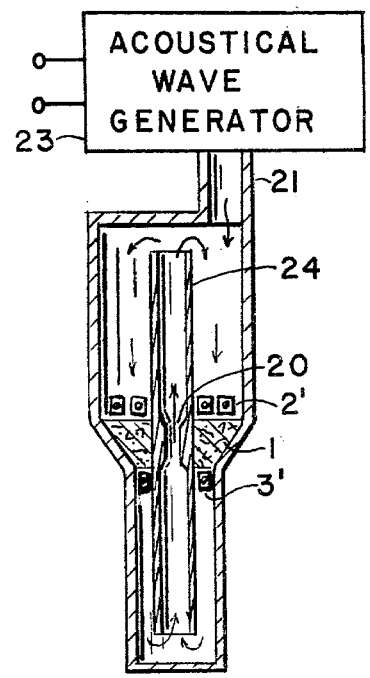
FIG. 6

RESONANT TRAVELLING WAVE HEAT ENGINE

BACKGROUND OF THE INVENTION

This invention is an improvement to a heat engine which uses acoustical waves to cause expansion and contraction of a unit of motivating fluid.

Stirling engines have the potential for very high efficiency. Unfortunately they are somewhat complex and are subject to internal losses that increase rapidly with power and compromise the high efficiency and limit the specific power output. The travelling wave heat engine, disclosed in U.S. Pat. No. 4,114,380 is attractive in that it is a simplified form of Stirling engine having no pistons. However, it suffers even more from the same internal loss mechanism and the resulting decreased efficiency and maximum power.

SUMMARY

This invention uses an acoustic resonant cavity to superimpose standing waves on the travelling wave of a travelling wave heat engine in order to increase the power throughput of the engine for a given level of internal losses. The cavity is so arranged that the standing waves have their pressure maximum and velocity node (zero) at the regenerator site and so reinforce the pressure component of the travelling wave without adding to the velocity component, the latter being chiefly responsible for regenerator losses.

It is the object of this invention to provide an improved travelling wave heat engine which has lower regenerator losses and higher maximum power throughput.

BRIEF DESCRIPTION OF DRAWINGS

FIG. 1 is a cross-sectional view of a resonant travelling wave heat engine which has a one wave length long resonator.

FIG. 2 is a graph of pressure due to the travelling wave alone, the total pressure due to the travelling wave plus the standing wave, and the velocity, all versus time for a small fluid volume in the regenerator.

FIG. 3 is a graph of the pressure and velocity components of the standing wave in the resonator versus position. The ends of the graph correspond to the ends of the resonator.

FIG. 4 is a cross-sectional view of an alternative construction of a resonant travelling wave heat engine having a resonator shorter than a half wave length.

FIG. 5 is a schematic drawing of a self-sustaining oscillator built around a resonant travelling wave heat engine and connected to a linear alternator to provide electrical power from a thermal energy source. The arrows show the direction of travelling wave propagation.

FIG. 6 is a cross-sectional view of a heat pump built around a resonant travelling wave heat engine, which like the device of FIG. 5, has the output waves returned to the input. In this case the return pipe is internal. An electrically powered transducer provides acoustical waves to operate the device. The arrows show the direction of travelling wave propagation.

DESCRIPTION OF THE PREFERRED EMBODIMENT

FIG. 1 shows the preferred embodiment of a Resonant Tavelling Wave Heat Engine (RTWHE). The regenerator (1) is fine enough that the gas in any part of it is essentially at the same temperature as the surrounding regenerator, but not so fine as to unduly impede the passage of sound waves. When the RTWHE is to be operated as a heat engine (rather than as a heat pump) hot fluid is circulated through the upper heat exchanger (2) while cold fluid is circulated through the lower heat exchanger (3) to heat and cool the ends of the regenerator and set up a temperature gradient in the regenerator. The resonator consists of the regenerator plus the tubes (4) and (5) which are terminated by transitions (6) and (7). The travelling waves are brought in through the input tube (8), through transition (6) into the resonator. The output waves leave through transition (7) and out the output tube (9). The input and output tubes are of smaller diameter than the resonator tubes. The transitions are gradual to reduce eddy formation and losses at high acoustic intensities. The length (10) of the resonator is approximately equal to one wavelength (of the acoustical waves going through the device), and the regenerator is placed in the approximate center of the resonator near the pressure maximum and velocity node for reasons explained below.

FIG. 2 shows the pressure and velocities that a gas molecule in the regenerator experiences due to the acoustical waves. Since positive velocity corresponds to flow of gas towards the hotter end and heating of the molecule, while increases in pressure correspond to compression, one can identify the four standard phases of a heat engine: compression (11), heating (12), expansion (13), and cooling (14). As in other heat engines, this cycle results in thermal energy being transformed into a mechanical form which in this case is acoustical energy. That is, thermal energy is used to amplify the waves.

The average power flow in the the device PWR, due to the travelling wave, is given by $PWR=PV$, where P is the local RMS pressure, and V is the RMS volumetric flow of gas. In going through the differentially heated regenerator from cold to hot, the volumetric flow of the wave increases because of heating and cooling of the gas: $V'=V(T'/T)$, where V' and T' are the volumetric flow and temperature of the final wave, for a gas that can be approximated as an ideal gas. Assuming reasonably low resistance R to flow caused by the regenerator, so that the pressure is essentially the same on both sides of the regenerator, the power of the outgoing wave is given by:

$$PWR'=V'P=VP(V'/V)=PWR(V'/V)=PWR(T'/T).$$

Note that the regenerator is basically a flow amplifier (as opposed to a pressure amplifier). FIG. 1 shows the upper portion of the device enlarged to accomodate the increased volume of the wave and prevent reflections and mismatches which would otherwise result.

Resistance to gas flow through the regenerator packing is undesirable since it is a dominate loss mechanism, absorbing power as given by: $PWRL=V^2R$. On the other hand, regenerator packing resistance is an unavoidable attribute of the heat exchange area and regenerator effectiveness and is therefore necessary. In fact since the maximum output power of Stirling engines (and Tavelling Wave Heat Engines or TWHEs) is usually limited by the heat exchange rate of the regenerator which is proportional to its surface area, the regenerator area and corresponding flow resistance is usually made as large as possible in order to achieve attractive specific power.

One can reduce the regenerator loss at a given power level by increasing the P/V ratio, i.e. increasing the pressure component of the wave, while decreasing the velocity component. Since the product PV is maintained, the power throughput and energy transformation rates are maintained, while the loss, which is only dependent on V, is reduced. Thus the loss for a given power is reduced. Alternatively, larger regenerator surface area and packing resistance can be employed with the same loss to achieve a greater energy throughput and specific power.

Normally the P/V ratio in a simple TWHE is fixed by the characteristic impedance of the gas ($Z \equiv P/V = \rho c/A$ where $\rho$ is the gas density, c is the velocity of sound, and A is the cross-sectional area of the pipe). However, it can be effectively changed by the addition of standing waves as is done in the above-described RTWHE. The resonator in the engine superimposes the standing wave (graphed in FIG. 3 versus position: (15) marks the resonator ends) in with the travelling wave. For the purpose of understanding the interplay of the various waves, it is useful to mentally decompose the standing wave into two oppositely travelling travelling waves components. Because of the design of the resonator, the component travelling in the direction of the travelling wave will be exactly in phase with the travelling wave. At the center, where the pressure is maximum (16), the pressure components of both wave components of the standing wave are in phase with each other (and also in phase with the travelling wave) and add up as shown in FIG. 2. At the same point, the velocity components of the standing wave components are exactly out of phase and so destructively interfere to produce a zero or node (17). Thus in the center of the resonator the pressure component of the travelling wave is augmented by the standing wave, while the velocity component is unchanged. That is to say, that at the center there is an effective increase in the P/V ratio. The regenerator of a RTWHE is located in the center of the resonator to capitalize on this increased P/V ratio. Because of the transition from the input tube to the resonator, the velocity component of the travelling wave will actually be decreased in the resonator over what it is in the input and output tubes while P in increased. The result is that the product PV in the center is the same as in the input tube. Thus, the power there is the same as it is in the input tube. The power and gain thus remain the same as in a simple TWHE. However, the P/V ratio is increased in the RTWHE, lowering the packing resistance losses and/or increasing the maximum power throughput.

Note that the above argument is independent of tubing diameter, i.e. for the same diameter regenerator, and same packing resistance P/V will cause less power loss in the RTWHE. On the other hand, the smaller constricted input and output tubes of the RTWHE do concentrate the wave intensity in these places. However, since these places have no packing, they should have reasonably small flow losses, particularly if they are gradual or rounded as shown in FIG. 1.

Analogies to electrical transmission lines and resonant transformers can be made. One familiar with these will note that pressure, P, is analogous to voltage, volumetric flow, V, to electrical current, and the P/V ratio is the impedance. The input tube represents a high impedance input compared with the larger diameter resonant tube since the former has a smaller cross-sectional area and smaller V for the same P. One half wave length down the resonator corresponds to a full circle on a Smith chart, so the driving impedance at this point is real and of the high impedance of the input tube, even though the diameter here is large. Similarly, the output end represents a large load impedance which imposes an equally large effective load impedance to the center (on the regenerator). Thus the regenerator is effectively driven and loaded by a high impedance source and load. In the same analogy, the amplifying action of the regenerator is analogous to a current amplifier, and the packing resistance is analogous to a series resistance. The resonator acts as a set of half wave length resonant transformers (although uncommon, since one quarter wave transformers are usually used) to image the high impedance of the input and output tubes into the amplifier and so reduce the amplifier losses. The enlarged upper end represents a lower characteristic impedance to properly match to the lower output impedance of the current amplifier.

The present invention is different from a standing wave heat engine (SWHE) or singing pipe, because in the latter the regenerator is located in between the velocity and pressure nodes to utilize both velocity and pressure components of the standing wave. Because of the phasing of the velocity and pressure components of standing waves, compression and positive gas movement occur simultaneously, and expansion and negative gas movement also occur simultaneously. Thus an ineffective regenerator must be used to introduce thermal delay in the heating and cooling. Unfortunately, this also makes the device irreversible and inefficient. On the contrary, a TWHE uses the velocity and pressure components of the travelling wave to move the gas. In a travelling wave, these are properly phased such that positive gas movement and heating automatically follow compression and negative movement and cooling follow expansion. Thus there is no need for additional delays and a very effective heat exchanger can be used. The addition of standing waves in a RTWHE adds, in phase, only to the pressure component, not to the velocity component. Thus the regenerator experiences a travelling wave velocity component and an augmented pressure component that are phased as in a travelling wave. Therefore, in the present invention the total P and V cycle is phased as in a travelling wave but with an increased P/V ratio.

It should be noted that it might be desirable to move the regenerator slightly off from the center of the resonator and so slightly change the relative phase of the P and V components to correct for small, unavoidable thermal delays due to finite regenerator area.

ALTERNATE CONSTRUCTIONS

A great many types of resonators would suffice as the means for superimposing a standing wave in with the travelling wave. Only a few of these will be discussed here for the sake of demonstrating some possibilities. The only requirement is that the regenerator be placed near the velocity node and the pressure maximum. FIG. 1 shows a one wave length resonator tube of larger diameter than the input and output tubes. Similarly, a half wave length resonator tube of diameter smaller than the input and outputs could be used. FIG. 4 shows still another construction: a resonator of length (18) shorter than one half wave length consisting of small diameter tubes (4) and (5) making up the ends of the resonator and an enlarged tube (19) making up the central part containing the regenerator. The center region experiences a pressure increase due to the resonator but no velocity component increase, since the velocity node is in the center. This construction has the advantage of being very short. On the other hand, the transition between the enlarged section and the smaller diameter sections is relatively abrupt and so would be prone to losses at high power.

As with the invention of U.S. Pat. No. 4,114,380, this invention could be used in closed loop applications. FIG. 5 shows an acoustical oscillator constructed out of the device of FIG. 1. The output and input of that device are joined by a very short, small diameter tube (20) (or iris) to allow the amplified wave to reenter the input. The acoustical path around the circuit (which consists mostly of the resonator) should approximately equal one wave length. A side branch (21) of the upper resonator taps off part of the generated acoustical power to feed a linear alternator (22) for the production of electrical power. In addition, this invention could be used for a variety of other applications and acoustical circuits using acoustical power directly or indirectly such as those referred to in U.S. Pat. No. 4,114,380 for a TWHE.

Again, as with the TWHE, the RTWHE is reversible and can be used as in an acoustical wave driven heat pump (see U.S. Pat. No. 4,114,380 for details of the TWHE heat pump). The RTWHE heat pump operation is essentially the same except that it will be capable of greater capacity for the same internal loss levels because of its enhanced P/V ratio. FIG. 6 shows a RTWHE heat pump being driven by an electrically powered acoustical wave source (23). The embodiment shown in FIG. 6 has the return half (24) of the resonator and coupling iris (20) inside the rest of the heat engine. This reentrant design could equally well be used in the oscillator of FIG. 5 to make it more compact. The heat exchangers (2') and (3') are bent in circular shapes to allow room for the internal sound return pipe (24). There is considerable freedom in locating the coupling iris (20) and regenerator (1) in the circuit. They generally should be opposite each other in the circuit. However, if desired, they could be moved: e.g. one might be located at the top of the tubes while the other is at the bottom. Note also that instead of the electrically driven acoustical wave generator (23), a RTWHE oscillator such as that of FIG. 5 might be used to drive the device of FIG. 6. A circuit such as that shown in FIG. 7 of U.S. Pat. No. 4,114,380 might also be employed with RTWHEs in place of the TWHEs shown.

In a RTWHE heat pump some provision must be made to prevent acoustical waves from travelling around the wrong direction. Since in normal operation of the heat pump, the upper heat exchanger (2') will be hotter than the lower one (3'), self-generated oppositely travelling waves would be amplified and could cancel the heat pumping action. This could be prevented by electronically sampling the waves in the circuit (e.g. with a microphone) and controlling the phase of the wave generator to correctly reinforce the correctly travelling waves while cancelling out the oppositely travelling one. Two independent electrical wave generators at different points around the circuit may be more effective than the one. Oppositely travelling waves might also be prevented by adding damping devices or extra regenerator resistance to dampen out the self-generated, undriven waves at the expense of some efficiency.

Instead of using heat exchangers (2) and (3) to carry heat to and from the RTWHE, hot and cold streams of the engine's working fluid (a gas) could also be used similar to that used in the device of FIG. 4 of U.S. Pat. No. 4,114,380.

I claim:
1. A travelling wave heat engine comprising:
   a. a compressible fluid capable of supporting propagation of an acoustical travelling wave,
   b. a means for adding thermal energy to the fluid in one region of space (region A),
   c. a means for extracting thermal energy from the fluid in another region of space (region B),
   d. at least one stationary object in and/or between the two regions in approximate thermal equilibrium with the fluid there, which causes the temperature gradient which exists in the fluid there to remain essentially stationary in the presence of wave induced fluid motion through the gradient, and
   e. a means for causing an acoustical travelling wave to propagate on a path through the fluid from region B, through the region of stationary temperature gradient, into region A, in such a manner that the wave moves fluid back and forth through the stationary temperature gradient and so causes the fluid there to be heated and/or cooled in conjunction with the compression and expansion of the wave, for the purpose of transforming energy between the thermal form of the temperature gradient and the acoustical form of the travelling wave,
   wherein the improvement comprises:
   f. a means for superimposing a standing wave in with the travelling wave such that its velocity node and its pressure maximum are approximately positioned in the region of the stationary temperature gradient for the purpose of enhancing the pressure component of the travelling wave without appreciably increasing the velocity component for the purpose of causing a reduction in viscous losses in the regenerator for a given acoustical power level or increasing the maximum power throughput of the engine for a given viscous loss level.

2. The heat engine in claim 1 in which region A is maintained at a higher temperature than region B, such that the travelling wave propagates from cold to hot through the stationary temperature gradient, for the purpose of transforming thermal energy into acoustical energy.

3. The heat engine of claim 2 further characterized by a means for converting the acoustical energy produced by said heat engine into other forms of electrical and mechanical energy.

4. The heat engine of claim 1 in which region A is maintained at a lower temperature than that of region B by the heat pumping action of the travelling waves through the stationary temperature gradient, for the purpose of providing a source of heat or cold.

5. The heat engine of claim 1 wherein the means for superimposing a standing wave is a one wave length long pipe acting as an acoustical resonator having a velocity node near its center and so positioned that this node coincides with the region of the stationary temperature gradient.

6. The heat engine of claim 5 wherein the acoustical input end of the resonator is connected to the acoustical output end of the resonator by a length of tubing, short compared with a wave length, and of smaller diameter than the resonator, for the purpose of allowing the exiting travelling waves to re-traverse the region of the stationary temperature gradient.

7. The heat engine of claim 1 wherein the means for superimposing a standing wave is a pipe acting as an acoustical resonator of length less than one half wave length and which is constricted near its extremities and widened around the center region, the latter region containing the regenerator.

* * * * *